US008553541B2

(12) United States Patent
Mihaly et al.

(10) Patent No.: US 8,553,541 B2
(45) Date of Patent: Oct. 8, 2013

(54) NETWORK TRAFFIC TRANSFER BETWEEN A RADIO BASE STATION NODE AND A GATEWAY NODE

(75) Inventors: Attila Mihaly, Dunakeszi (HU); Zoltán Richárd Turányi, Budapest (HU); Lars Westberg, Enköping (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 319 days.

(21) Appl. No.: 12/997,758

(22) PCT Filed: Jun. 13, 2008

(86) PCT No.: PCT/EP2008/004779
§ 371 (c)(1),
(2), (4) Date: Dec. 13, 2010

(87) PCT Pub. No.: WO2009/149732
PCT Pub. Date: Dec. 17, 2009

(65) Prior Publication Data
US 2011/0110225 A1    May 12, 2011

(51) Int. Cl.
*H04L 12/26* (2006.01)
*H04L 12/28* (2006.01)
*H04L 12/50* (2006.01)

(52) U.S. Cl.
USPC ........ 370/230; 370/230.1; 370/231; 370/235; 370/351; 370/360

(58) Field of Classification Search
None
See application file for complete search history.

(56) References Cited

U.S. PATENT DOCUMENTS

| 8,009,652 B2 * | 8/2011 | Toskala .................. 370/342 |
| 2005/0281244 A1 | 12/2005 | Toskala |
| 2006/0088034 A1 | 4/2006 | Santitoro |

FOREIGN PATENT DOCUMENTS

| WO | 0203623 A1 | 1/2002 |
| WO | WO 2007/130281 | 11/2007 |
| WO | WO 2008/064286 | 5/2008 |

OTHER PUBLICATIONS

European Office Action issued in Application No. 08 759 234.1 dated Feb. 27, 2012.
3GPP TS 29.060, V8.5.0; 3rd Generation Partnership Project; Technical Specification Group Core Network and Terminals; General Packet Radio Service (GPRS); GPRS Tunnelling Protocol (GTP); Release 8, (Sep. 2008).
International Search Report for PCT/EP2008/004779, mailed Jun. 5, 2009.
Written Opinion of the International Searching Authority for PCT/EP2008/004779, mailed Jun. 5, 2009.
International Preliminary Report on Patentability for PCT/EP2008/004779, dated Apr. 13, 2010, with Four (4) Amended Sheets.

* cited by examiner

*Primary Examiner* — Ayaz Sheikh
*Assistant Examiner* — Blanche Wong
(74) *Attorney, Agent, or Firm* — Nixon & Vanderhye P.C.

(57) ABSTRACT

A technique for transferring network traffic between a radio base station (RBS) node and a gateway (GW) node of a mobile telecommunications network is described. A method embodiment comprises the steps of providing a first transport link and a second transport link between the RBS node and the GW node. The first transport link is configured to transport network traffic of a higher priority and the second transport link is configured to transport network traffic of a lower priority. The method further comprises distributing network traffic over the transport links depending on an assignment between the transport links and priority settings associated with the network traffic.

28 Claims, 10 Drawing Sheets

NETWORK TRAFFIC TRANSFER BETWEEN A RADIO BASE STATION NODE AND A GATEWAY NODE

This application is the U.S. national phase of International Application No. PCT/EP2008/004779 filed 13 Jun. 2008, which designated the U.S., the entire contents of which is hereby incorporated by reference.

TECHNICAL FIELD

The present invention generally relates to mobile communications. Specifically, the invention is directed to a technique for transferring network traffic between a radio base station (RBS) node and a gateway (GW) node of a mobile telecommunications network.

BACKGROUND

Third generation (3G) telecommunications systems based on Wideband Code Division Multiple Access (WCDMA) radio access technologies have just recently been deployed all around the world. Since user and operator requirements and expectations continue to evolve, the Third Generation Partnership Project (3GPP) has begun working on future telecommunications systems, so-called Long-Term Evolution (LTE) systems.

Figure 1:
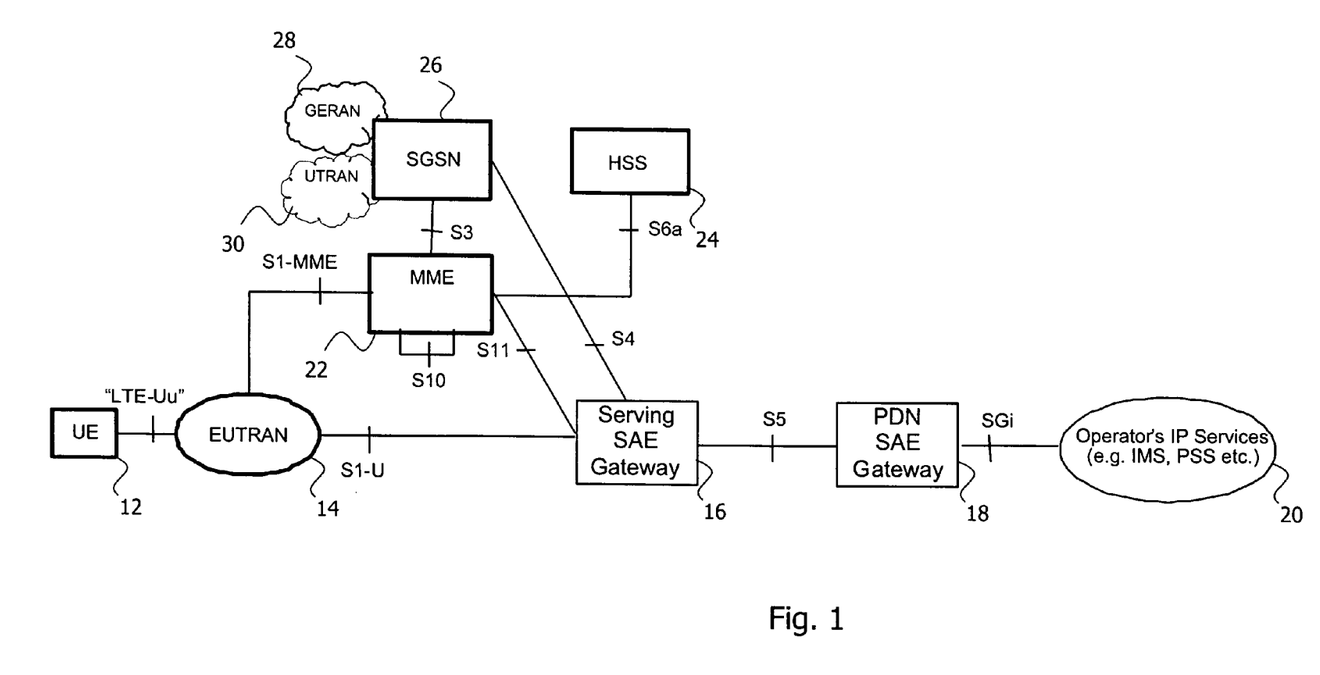
FIG. 1 is a schematic overview of an LTE network system in which embodiments of the present invention can be implemented.

LTE systems will have an Internet Protocol (IP)-based network architecture that is currently standardized in connection with the System Architecture Evolution (SAE) project. The current status of the SAE network architecture is schematically illustrated in FIG. 1. Briefly, the SAE project specifies a split-type architecture with a user plane and a control plane. The user plane comprises user equipment (UE) 12, an Evolved Universal Mobile Telecommunications System Terrestrial Radio Access Network (EUTRAN) 14, one or more GW nodes 16, 18 and a Packet Data Network (PDN) 20. The EUTRAN 14 includes at least one RBS node not shown in FIG. 1. On the control plane, a Mobility Management Entity (MME) 22 is in charge of handling control plane signalling as well as mobility-related tasks. The MME 22 node interfaces a Home Subscriber Server (HSS) 24 which, among other things, stores subscription-related information.

Compared to 3G systems, the SAE network architecture is flat in that it comprises fewer types of network nodes. For example, the functions of Node Bs, Radio Network Controllers (RNCs) and Serving GPRS Support Nodes (SGSNs) of conventional 3G networks are now handled by RBS nodes, and GW nodes serve as common anchor points for all network access technologies.

According to the deployment variant illustrated in FIG. 1, the GW node is split into two dedicated physical nodes, a Serving GW node 16 on the one hand and a PDN GW node 18 on the other hand. According to a further deployment variant, the functionalities of the Serving GW node 16 and the PDN GW node 18 may be integrated in a single physical node.

The Serving GW node 16 interfaces the EUTRAN 14 and constitutes an anchor point for intra-3GPP mobility. The PDN GW node 18 interfaces the PDN 20 and serves as common anchor point for all network access technologies, providing a stable IP point-of-presence for all UE 12 regardless of mobility within or between access technologies. The MME 22 is kept separate from the GW nodes 16, 18 to facilitate network deployment and scaling of capacity. For this reason, only two node types, the RBS nodes and GW nodes 16, 18, need to scale in capacity to accommodate larger increases in network traffic.

Conventional mobile telecommunications systems according to, for example, the Global System for Mobile Communications (GSM) standard or the UMTS standard may be integrated into the LTE system. To this end, standardized interfaces are utilized between the LTE core network and a SGSN 26 that is coupled to an GSM EDGE RAN (GERAN) 28 and an UMTS Terrestrial RAN (UTRAN) 30 as shown in FIG. 1. The interface between the SGSN 26 and the MME 22 is utilized for transferring context information and establishing radio access bearers (RABs) when moving between different access types. The interface between the SGSN 26 and the Serving GW node 16, on the other hand, is utilized for establishing IP connectivity. The Serving GW node 16 basically acts as a Gateway GPRS Support Node (GGSN) for GSM and UMTS terminals.

A crucial advantage of the LTE network is its capability of providing Quality of Service (QoS) guarantees. To this end, each logical connection through the LTE network, also called tunnel, may be associated with a dedicated QoS class. Each tunnel has an associated Packed Data Protocol (PDP) context and RAB. Any user equipment may concurrently have multiple tunnels, possibly associated with different QoS classes.

It is expected that the introduction of mobile broadband services in connection with the deployment of LTE systems will lead to a drastic increase in network traffic. Current models predict that only approximately 10% of this network traffic will actually require a guaranteed QoS, while 90% of the network traffic will be Best Effort (BE) traffic not requiring any QoS guarantees. Obviously, it is desirable to take this traffic distribution into account when optimizing the LTE network architecture further.

SUMMARY

Accordingly, there is a need for optimizing the transport mechanism between RBS nodes and GW nodes such that transmission resources are efficiently utilized.

According to a first aspect, a method of transferring network traffic between an RBS node and a GW node of a mobile telecommunications network is provided, the method comprising providing at least a first transport link and a second transport link between the RBS node and the GW node, the first transport link being configured to transport network traffic of a higher priority and the second transport link being configured to transport network traffic of a lower priority, and distributing network traffic over the transport links depending on an assignment between the transport links and priority settings associated with the network traffic.

The term traffic 'priority' as used herein in a network traffic context generally describes characteristic requirements of individual traffic flows. Such characteristic requirements may, for example, specifically be expressed in terms of delay, jitter, packet loss, and so on. Moreover, the characteristic requirements may also be expressed in general terms such as traffic classes (e.g., QoS classes). The priority settings associated with the network traffic may relate to various parameters utilized in the mobile telecommunications network. For example, the priority settings may be associated with transmission resources such as network traffic transport bearers. According to a further variant, the priority settings are derived from subscription information of a user generating the network traffic.

The assignment between the transport links and the priority settings can be performed dynamically or can be realised in the form of a static assignment. In one implementation, the assignment is performed using a mapping mechanism. The mapping mechanism can be realised using a look-up table.

The mobile telecommunications network in which the present teachings are implemented may comprise a plurality of protocol layers as specified, for example, in the 5-layer or the 7-layer reference model of the International Organisation for Standardisation (ISO). For example, the mobile telecommunications network may comprise a link layer, and the network traffic distribution over the transport links may be performed by a link layer control function. Moreover, the mobile telecommunications network may comprise a network layer, and the network traffic distribution may be performed by a network layer control function.

The OSI reference model does, of course, not imply that all the layers defined in the model actually have to be implemented in the network systems described herein. Rather, and depending on the specific requirements and conditions, one or more layers of the OSI reference model may be omitted or combined as generally known to the skilled artisan. Moreover, the skilled artisan will appreciate that references to a communications network comprising a specific layer may be interpreted as this specific layer spanning between two (e.g., adjacent) network nodes on the specific level. For example, the network layer spans between two network nodes on the network level, the link layer spans between two network nodes on the link level, and so on.

The control function performing network traffic distribution (or network traffic separation) may be installed on at least one of the RBS node, the GW node and a separate node. The separate node may, for example, be realised in the form of a switch or router.

In one implementation, the control function performs network traffic distribution in accordance with a priority marking included in network traffic data units (such as data packets). The priority marking may be inserted by an application function depending on the priority setting associated with the network traffic. The application function inserting the priority markings into the network traffic data units may be installed on at least one of the RBS node, the GW node and a separate node. In cases in which the application function is installed on the RBS node or the GW node, the application function may additionally be in charge of performing the mapping between different transport bearers and transport tunnels on the incoming and outgoing interfaces of these nodes.

As discussed above, network traffic distribution may be performed by either a link layer control function or a network layer control function. According to a further variant, network traffic distribution may also be performed by an application layer control function. The application layer control function may be installed on at least one of the RBS node, the GW node and a separate node.

In one realisation, the first transport link stretches between a first interface associated with the RBS node and a first interface associated with the GW node, and the second transport link stretches between a second interface associated with the RBS node and a second interface associated with the GW node. In a first implementation, the first and second interfaces are directly installed on the RBS node and the GW node. In a second implementation, at least some of the first interfaces and second interfaces are installed on a router or a switch associated with either the RBS node or the GW node and located in a communication path between the RBS node and the GW node.

In the case of a mobile communications network according to the LTE standard, the first and second interfaces may be configured as S1_U interfaces. Moreover, each interface may be associated with a specific network address, such as an IP address. In certain situations, one or more of the interfaces may share a single network address.

One or more data unit generation functions may be provided for encapsulating plane data (or 'lower-order data units') into data units (or 'higher-order data units'). The resulting data units may be data packets or IP datagrams. The first and second interfaces associated with a particular node (such as the RBS node or the GW node) may share a common data unit generation function. In such a case, network traffic distribution may logically be located between the common data unit generation function and the respective interfaces. For example, in the case of link layer or network layer control functions, network traffic distribution may be performed on or above the link layer or network layer, respectively, by selectively sending network traffic to the interface that connects to the assigned transport link.

In another variant, the first and second interfaces associated with a particular node each have a dedicated data unit generation function. In such a case, network traffic distribution may be performed upstream of the dedicated data unit generation functions from the perspective of the interfaces. In one realisation of this aspect, the application layer control function performs network traffic distribution by selectively sending network traffic towards the dedicated data unit generation function interfacing the assigned transport link.

The first transport link and the second transport link may utilise disjunct communication connections. For example, the first transport link may be a dedicated data communication connection with QoS guarantee, such as a legacy leased line, Metro Ethernet services, or Layer 2/Layer 3 Virtual Private Network (L2/L3 VPN) services. The second transport link may stretch at least partially across the Internet (which is unreliable and generally offers only very loose QoS guarantees). The network traffic of higher priority may be associated with (e.g., belong to or marked in a accordance with) a first QoS class, and the network traffic of lower priority may be associated with a BE class (e.g., with no specific QoS class), or with a second QoS class that is lower than the first QoS class.

The physical RBS node and the physical GW node may each be split in at least two logical entities, and each transport link may extend between a particular RBS entity and a particular GW entity. A user connection may be attached to the RBS and the GW entities interfacing the assigned transport link depending on subscription information. This process may in particular be carried out in a mobile telecommunications network comprising a user plane and a control plane. Specifically, the user plane may include the transport links and the control plane may include a control function adapted to control the attachment of a user connection to the RBS and GW entities. The control function may have access to a HSS for obtaining the required subscription information.

In a further realisation, a mechanism is provided for determining a failure in relation to one of the two or more transport links stretching between the RBS node and the GW node. In the case a transport link failure is determined, network traffic that is intended to be transported over the transport link effected by the failure may be transported over another transport link. In other words, the plurality of parallel transport links stretching between the RBS node and the GW node may be utilised for redundancy purposes.

According to another aspect, a computer program product is provided which comprises program code portions for performing the steps disclosed herein when the computer program product is run on a computing device. The computer program product may be stored on a computer-readable recording medium, such as a permanent or re-writable memory associated with the computing device or a removable data carrier, such as a CD-ROM or DVD. Additionally or in the alternative, the computer program product may be provided for download to the computing device, for example via the Internet or any other communications network.

According to a still further aspect, a device for transferring network traffic between an RBS node and a GW node of a mobile telecommunications network is provided. The device comprises dedicated interfaces coupled to at least a first transport link and a second transport link towards one of the RBS node and the GW node, the first transport link being configured to transport network traffic of a higher priority and the second transport link being configured to transport network traffic of a lower priority. The device further comprises a distributing function for distributing network traffic over the transport links depending on an assignment between the transport links and priority settings associated with the network traffic. The device may be part of an RBS node, a GW node, a router or a switch.

BRIEF DESCRIPTION OF THE DRAWINGS

In the following, the invention will be described further with reference to exemplary embodiments illustrated in the drawings, wherein.

DETAILED DESCRIPTION OF PREFERRED EMBODIMENTS

In the following description, for purposes of explanation and not limitation, specific details are set forth, such as particular network environments, communication standards, etc. in order to provide a thorough understanding of the present invention. It will be apparent to one skilled in the art that the present invention may be practised in other embodiments that depart from these specific details. For example, the skilled artisan will appreciate that while the invention is described in context with an LTE system, the invention can also be practised in other network systems comprising comparable network nodes.

Those skilled in the art will further appreciate that the functions explained herein below may be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that while the following embodiments are primarily described in context with methods and network nodes, the invention may also be embodied in a computer processor and a memory coupled to the processor, wherein the memory is encoded with one or more programs that perform the methods disclosed herein when executed by the processor.

The following embodiments will be described in connection with specific network nodes of the LTE-SAE network architecture schematically illustrated in FIG. 1. In this regard, FIG. 2 schematically depicts an embodiment of an RBS node 32 located within the EUTRAN 14 (in the following called evolved Node B, or eNodeB, in accordance with the LTE terminology) and an embodiment of a GW node 16 coupled to the eNodeB 32 via the S1_U interface as specified in the applicable LTE-SAE specification.

The skilled artisan will appreciate that the EUTRAN 14 may comprise multiple such eNodeBs 32. Furthermore, the skilled artisan will appreciate that the GW node 16 may either be a stand-alone Serving GW node 16 as illustrated in FIG. 1, or a Serving GW node that is integrated together with the PDN GW node 18 of FIG. 1 in a single physical GW node (not illustrated in the drawings).

Figure 2:
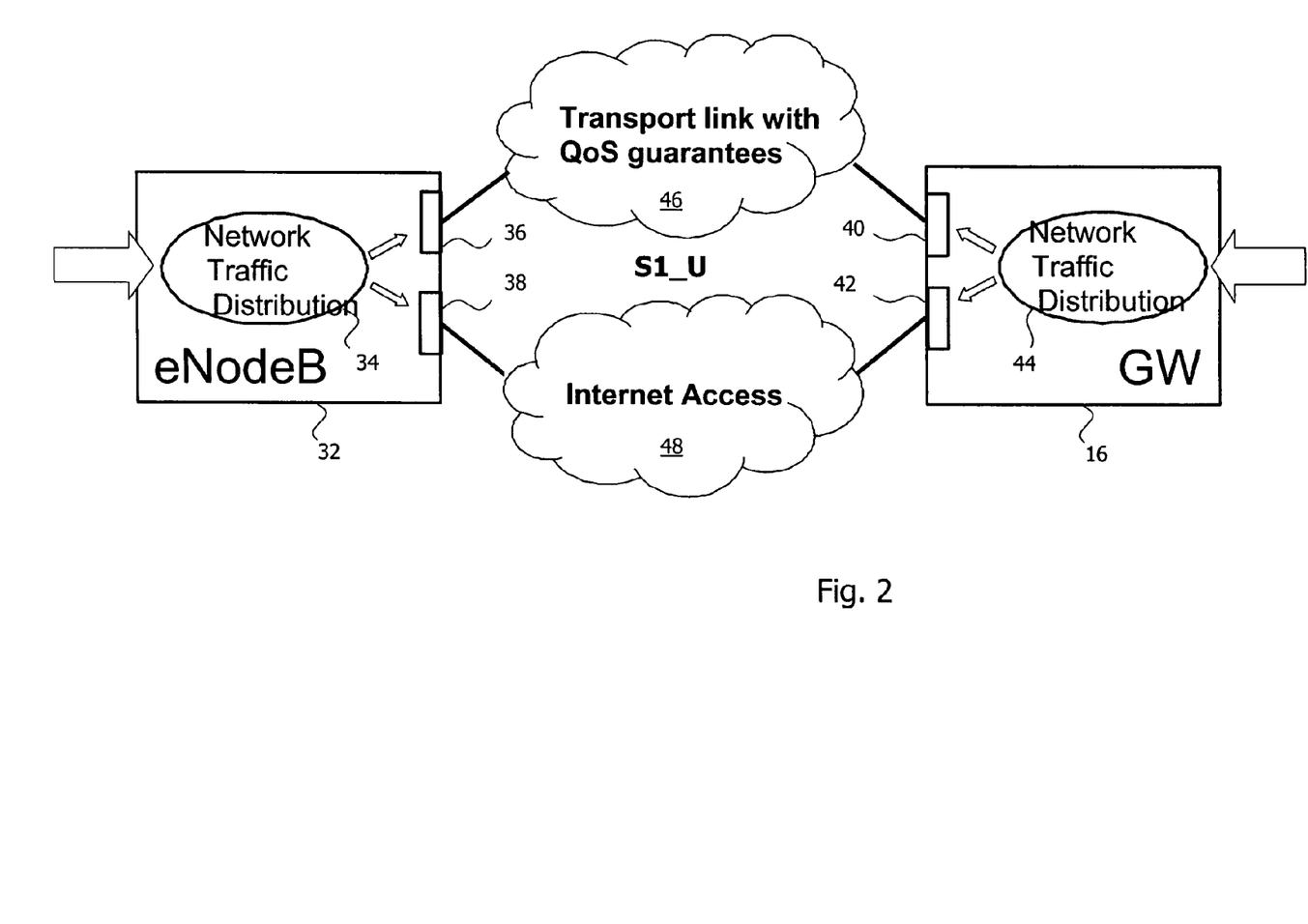
FIG. 2 schematically illustrates embodiments of an RBS node and a GW node.

As shown in FIG. 2, the eNodeB 32 comprises two physical or logical SLU interfaces 36, 38 as well as a network traffic distribution function 34 adapted to separate and to selectively distribute network traffic received from the UE 12 of FIG. 1 to either one of the two interfaces 36, 38. In a similar manner, the GW node 16 also comprises two physical or logical S1_U interfaces 40, 42 as well as a network traffic distribution function 44 adapted to separate and to selectively distribute network traffic received from the PDN 20 of FIG. 1 to either one of the two interfaces 40, 42.

As becomes apparent from FIG. 2, a first transport link 46 stretches between the interface 36 of the eNodeB 32 and the interface 40 of the GW node 16. Furthermore, a second transport link 48 stretches in parallel to the first transport link 46 between the interface 38 of the eNodeB 32 and the interface 42 of the GW node 16.

The first transport link 46 is configured to transport network traffic of a higher priority. Specifically, the transport link 46 is capable of supporting a guaranteed QoS. For example, the first transport link 46 may be provided with Service Level Agreement (SLA) guarantees appropriate for transporting network traffic generated by QoS sensitive applications. Such QoS sensitive applications may be real-time applications including telephony, television and multimedia applications. Typical examples for the first transport link include legacy leased lines, Metro Ethernet services, L2/L3 VPN services, and so on.

The second transport link 48 stretching in parallel to the first transport link 46 is configured to transport network traffic of a lower priority. Such network traffic may be associated with looser QoS requirements and resilient OoS guarantees suitable for BE applications such as Internet browsers. As shown in FIG. 2, the second transport link 48 may, for example, be realised in the form of a Digital Subscriber Line (DSL) access stretching at least partially over the Internet.

In the following, the operation of each of the eNodeB 32 and the GW node 16 illustrated in FIG. 2 will be discussed in more detail with reference to the flow diagram 300 of FIG. 3.

In a first step 302, the first transport link 46 capable of transporting network traffic of a higher priority is provided (e.g. established) between the eNodeB 32 and the GW node 16. Then, in step 304, the second transport link capable of transporting network traffic of a lower priority is provided (e.g. established) between the eNodeB 32 and the GW node

16. It should be noted that steps 302 and 304 can be performed simultaneously or in the opposite order.

In a next step 306, the respective network traffic distribution component 34, 44 separates ingoing network traffic and distributes the separated network traffic over the two transport links 46, 48 depending on an assignment between the transport links 46, 48 and priority settings associated with the network traffic. Such an assignment can, for example, be realised using a mapping relationship uniquely assigning each of the two transport links 46, 48 to network traffic originating from a particular subscriber or class of subscribers, or being transported on a specific transport bearer or class of transport bearers as will be described in more detail in the following embodiments.

Figure 3:
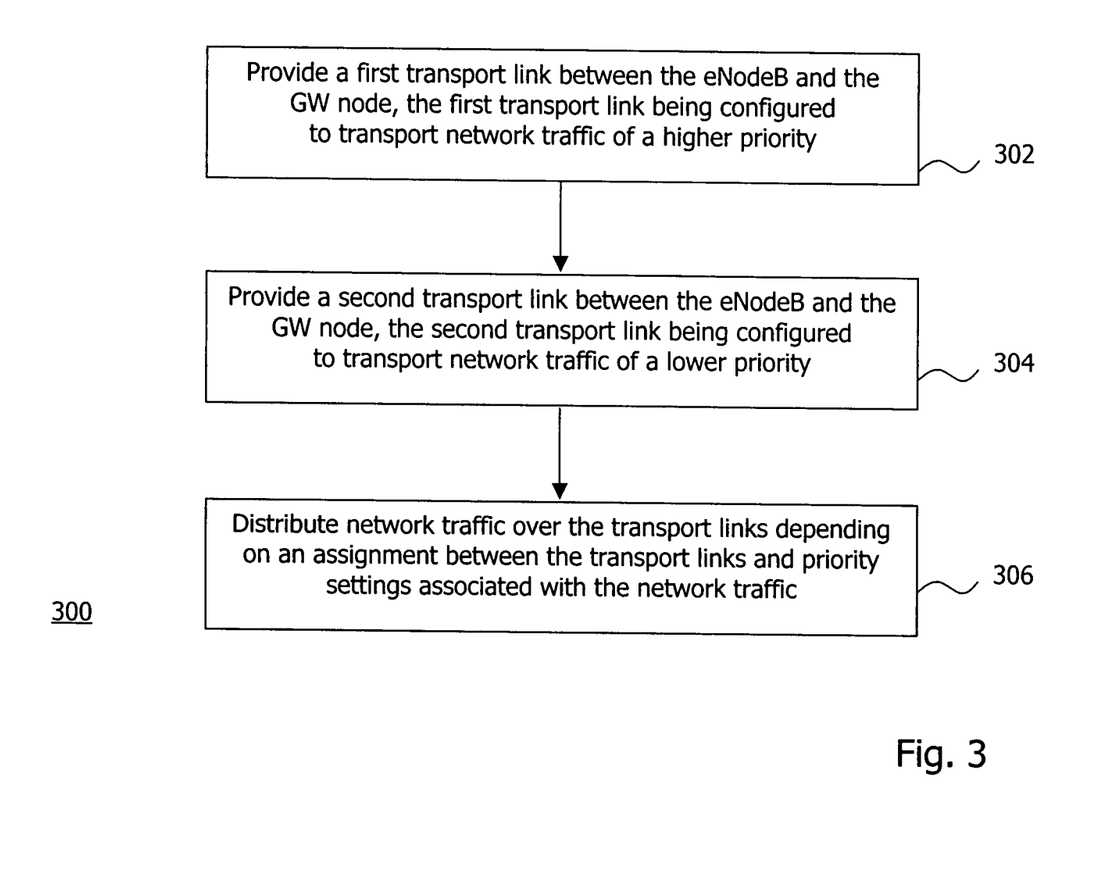
FIG. 3 is a flow diagram exemplarily illustrating a method embodiment.

The solution illustrated in FIGS. 2 and 3 has various advantages. For example, BE traffic not requiring any QoS guarantees, or requiring only very loose QoS guarantees, may be routed in a resource efficient manner over the second transport link 48, while the remaining network traffic requiring a guaranteed QoS may be routed over the more costly first transport link 46. Additionally, the network traffic distribution functions 34, 44 may each be equipped with mechanisms for detecting transportation link failures and for switching-over network traffic that is intended to be transported over a transport link effected by the failure to another transport link. Thus, the redundant connectivity offered on the S1_interface pairs 36, 40 and 38, 42 and transport links 46, 48 can additionally be utilised to enhance the overall system availability.

The transport link selection processes performed by the network traffic distribution functions 34, 44 of the eNodeB 32 and the GW node 16, respectively, can be realised in various ways. In the following, several exemplary design options of the network traffic distribution functions 34, 44 will be described in more detail. The first two design options are based on functions provided primarily in the eNodeB 32 and the GW node 16, while the third design option is based on functions implemented in the MME 22 illustrated in FIG. 1.

Figure 4:
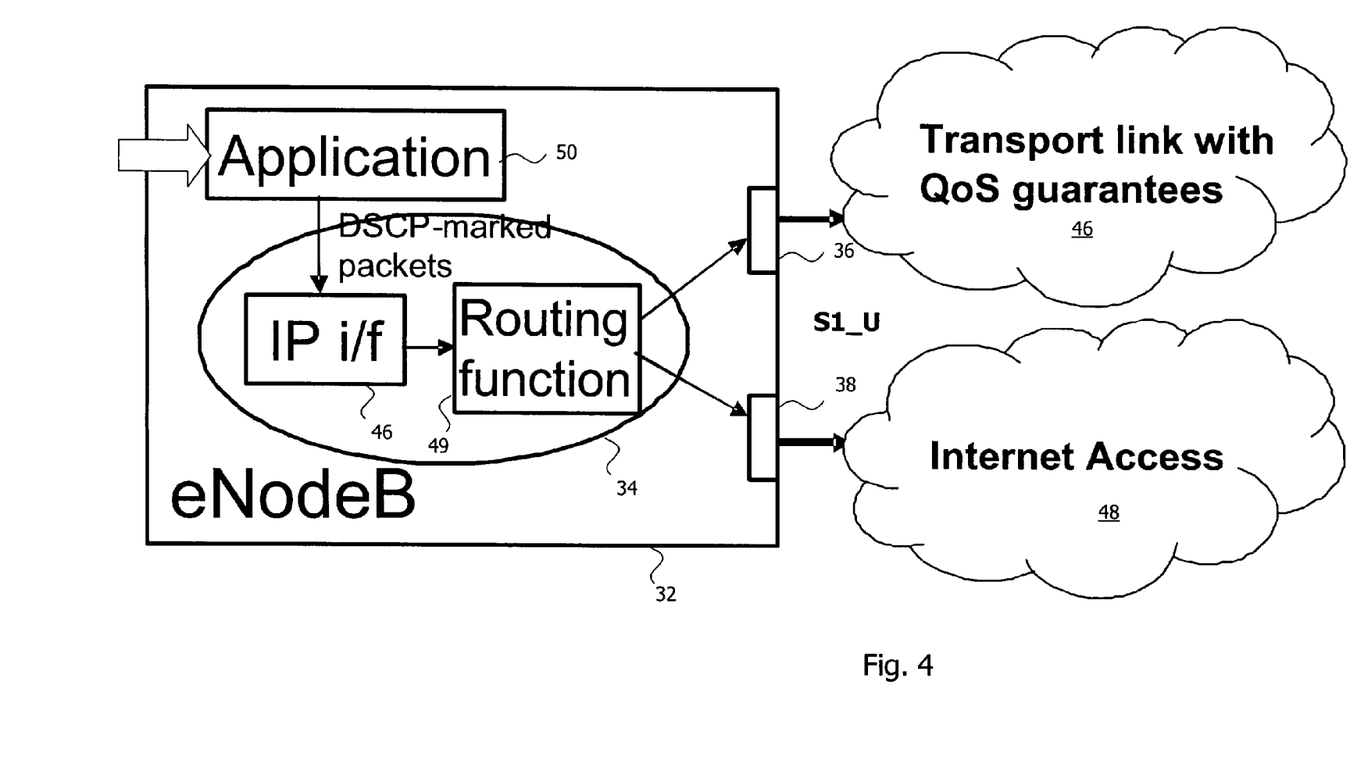
FIG. 4 schematically illustrates a further embodiment of an RBS node.

In the embodiments discussed now in context with FIGS. 4, 5, 6A and 6B, the network traffic distribution functions 34, 44 discussed above in context with FIG. 2 are implemented in the eNodeB 32 and the GW node 16 on or below the network layer. In this regard, FIG. 4 shows an exemplary configuration of the eNodeB 32 of FIG. 2. It should be noted that while FIG. 4 only illustrates the corresponding functionalities in the eNodeB 32, similar functionalities (and at least similar application functionalities) may exist in the GW node 16 of FIG. 2.

As shown in FIG. 4, the eNodeB 32 comprises an network traffic distribution function 34 with an IP interface 46 and a routing function 49. The eNodeB 32 further comprises an application function 50 coupled to the IP interface 46. The application function 50 of the eNodeB 32 is configured to perform the mapping between the different transport bearers and transport tunnels on the incoming and outgoing interfaces of the eNodeB 32.

The application function 50 is not limited to the application layer (i.e., to the seventh layer in the OSI reference model) but generally refers to an application component running on top of the hardware and software platform of the eNodeB 32. In the present embodiment, for example, the application function 50 is additionally configured to do IP packetization, which enables the application function 50 to encode QoS descriptors into DSCP settings as will now be explained in more detail.

Specifically, the application function 50 is configured to perform a first-level traffic distribution based on QoS descriptors associated with the various incoming transport bearers. To this end, the application function 50 analyses in a first step the QoS descriptor associated with a specific incoming transport bearer. In a second step, the application function 50 consults a local mapping table. The local mapping table defines unique assignments between all possible QoS descriptors on the one hand and the two (or possibly more) transport links 46, 48 on the other hand. In the second step, the application function 50 may, for example, determine that the first transport link 46 with QoS guarantees is assigned to the particular QoS descriptor of the analysed transport bearer.

Then, in a third step, the application function 50 inserts a priority marking indicative of the transport link 46 with QoS guarantees in the network traffic data packets arriving via the analysed transport bearers. In one implementation, the application function 50 may, for example, insert the priority marking in the data packets by setting the so-called DSCP field in the outer IP header of the data packets encapsulated over the SLU interface. Accordingly, setting the DSCP field indicates that the particular data packet is to be transported over the first transport link 46 with QoS guarantees. If, on the other hand, the DSCP field is not set, this is an indication that the corresponding data packet is to be transported over the second transport link 48 with no or only loose QoS guarantees.

Any data packets are then handed over from the application function 50 via the IP interface 46 of the network traffic distribution function 34 to the routing function 49 for a second-level traffic distribution. The routing function 49 is a network layer function that makes a selection of output interfaces 36, 38 (or associated output ports) based on an indication from the application function 50 (i.e., based on the DSCP settings of the received IP packets).

One possible implementation of the routing function 49 is the Open Shortest Path First (OSPF) protocol, since DSCP-based routing is a standard OSPF feature. Specifically, OSPF allows for the definition of separate routing tables that can be used for routing data packets having different Type Of Service settings in the corresponding TOS fields. Of course, IP routing techniques other than OSPF can also be used provided that they are capable of routing traffic to a single destination on different transport links depending on DSCP settings. Such transport link routes can be configured manually in the eNodeB 32 (or the GW node 16), or via an appropriate routing protocol. It will further be appreciated that the routing function 49 could alternatively also be implemented on the link layer and not on the network layer.

Figure 5:
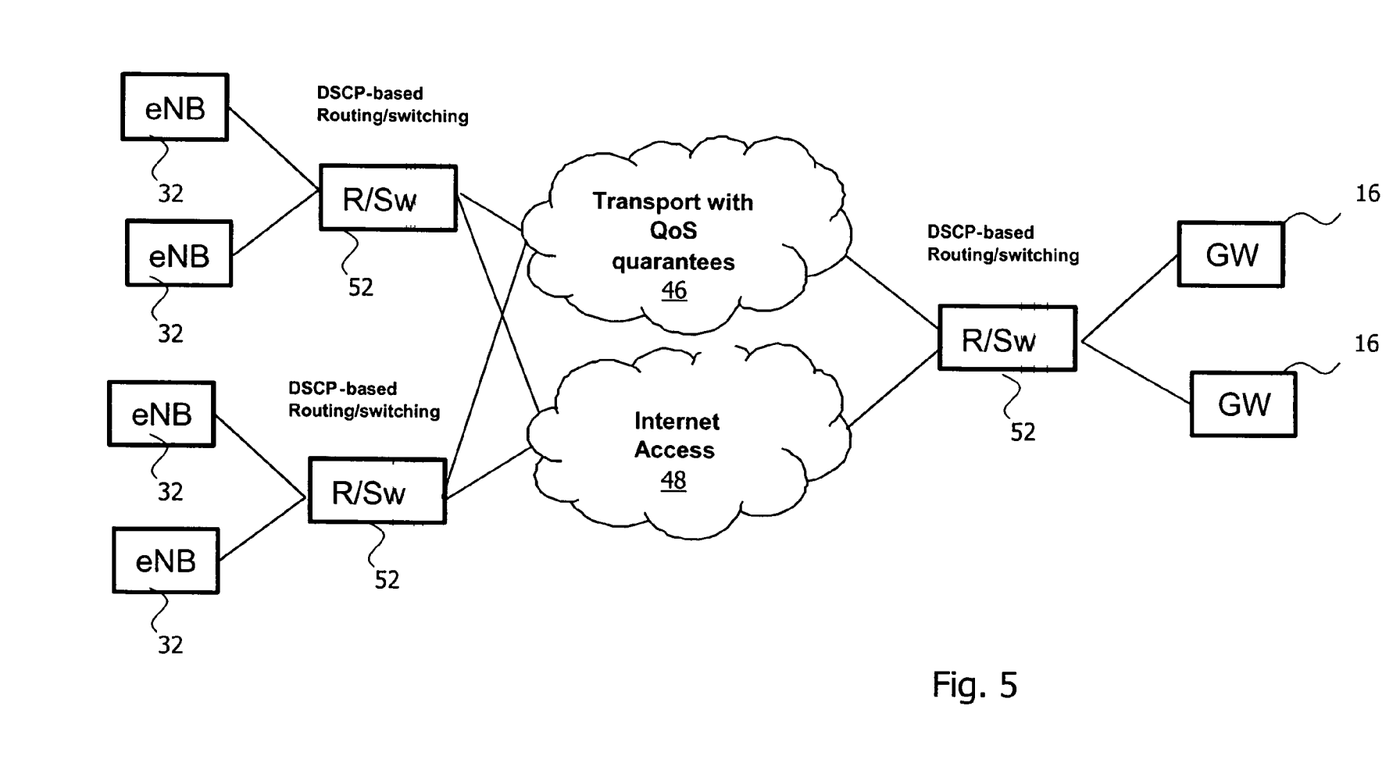
FIG. 5 schematically illustrates an embodiment of a system comprising various RBS nodes and GW nodes.

Referring now to FIG. 5, it should be noted that the network traffic distribution function does not necessarily have to be embedded in the eNodeB 32 or the GW node 16, but could alternatively be implemented on a different network node such as on a site router or switch 52 connecting to the transport links 46, 48, or even on a remote network traffic concentration node. The advantage of the setup illustrated in FIG. 5 is the fact that no specific routing functions need to be implemented in the eNodeBs 32 and GW nodes 16. Moreover, the routing functions could be concentrated for several eNodeBs 32 or several GW nodes 16 in a single site router or switch 52. The eNodeBs 32 and GW nodes 16 would thus have only to implement the DSCP marking function based on transport bearer QoS settings.

Figure 6A:
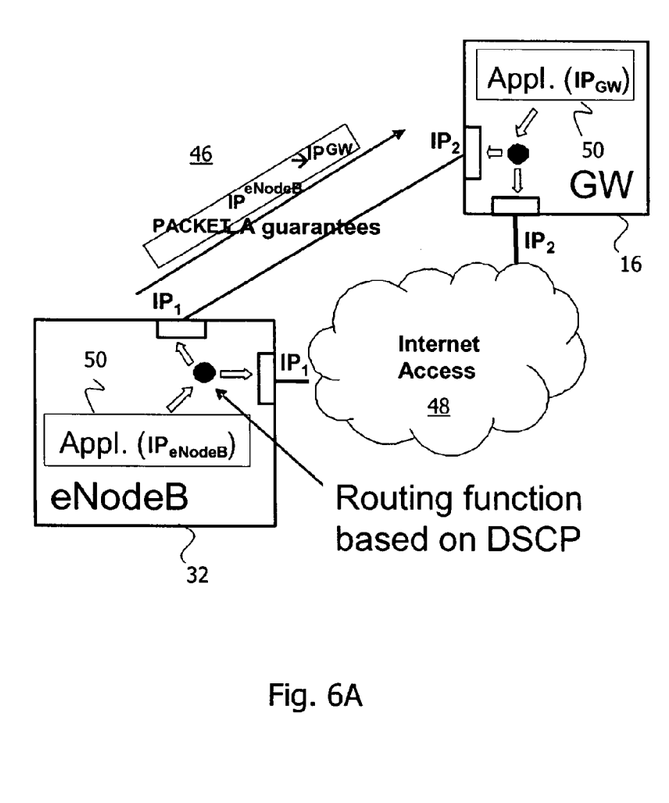
FIGS. 6a and 6b illustrate two further system embodiments comprising an RBS node and a GW node.
Figure 6B:
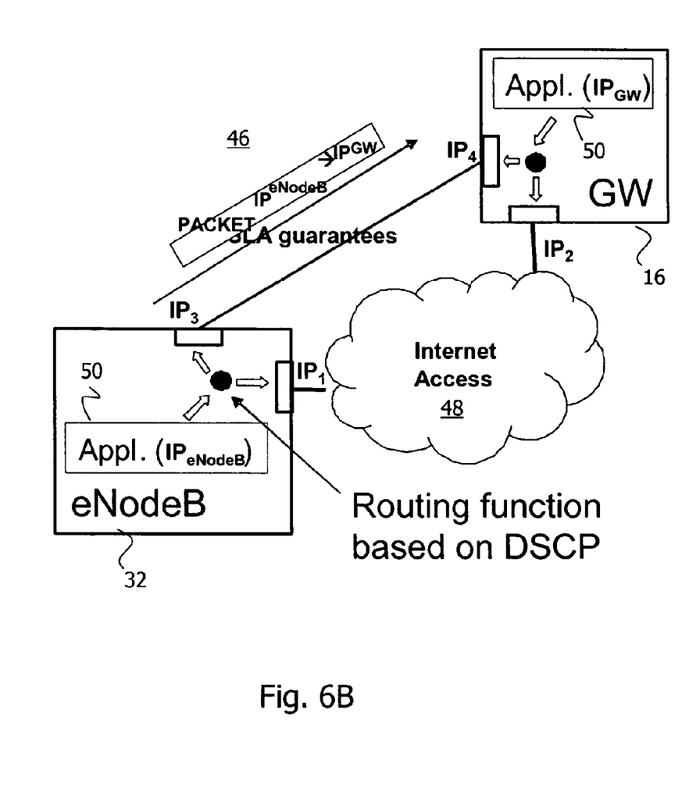

A special case of the embodiment illustrated in FIG. 4 is the situation in which there exists a direct connection between the eNodeB 32 and the GW node 16 on one of the transport links as shown in FIGS. 6A and 6B. Such a direct connection will typically be utilised for the transport link 46 with QoS guarantees. A direct connection may, for example, be realised via an operator-owned microwave connection, a leased line or a leased Ethernet VPN.

The characteristic feature of the setup illustrated in FIGS. 6A and 6B is the fact that everything which is sent on the direct connection 46 (e.g., a direct IP connection) will arrive at the other side, regardless of the IP addressing and routing. In other words, such a setup provides a further degree of freedom regarding IP addressing and routing. As a result, it is possible to use always the IP address of the Internet access (transport link 48) in applications residing on the eNodeB 32 and the GW node 16 for communication (i.e. as tunnelling endpoint), and the IP addresses of the eNodeB 32 and the GW node 16 need to be routable only in the Internet. Additionally, there is the freedom to use the same IP addresses as on the Internet link 48 also on the direct IP connection 46 (see FIG. 6A), or to use different IP addresses depending on the specific circumstances (see FIG. 6B).

Now, a further design option will be discussed with reference to FIGS. 7, 8 and 9. Instead of performing network traffic distribution on the network layer as discussed above in context with FIGS. 4, 5, 6A and 6B, network traffic distribution is now performed on the application layer (and again dependent on the QoS settings of the transport bearers). The distribution process may in this case be based on static rules assigning individual transport links to individual transport bearers (i.e. transport labels).

Figure 7:
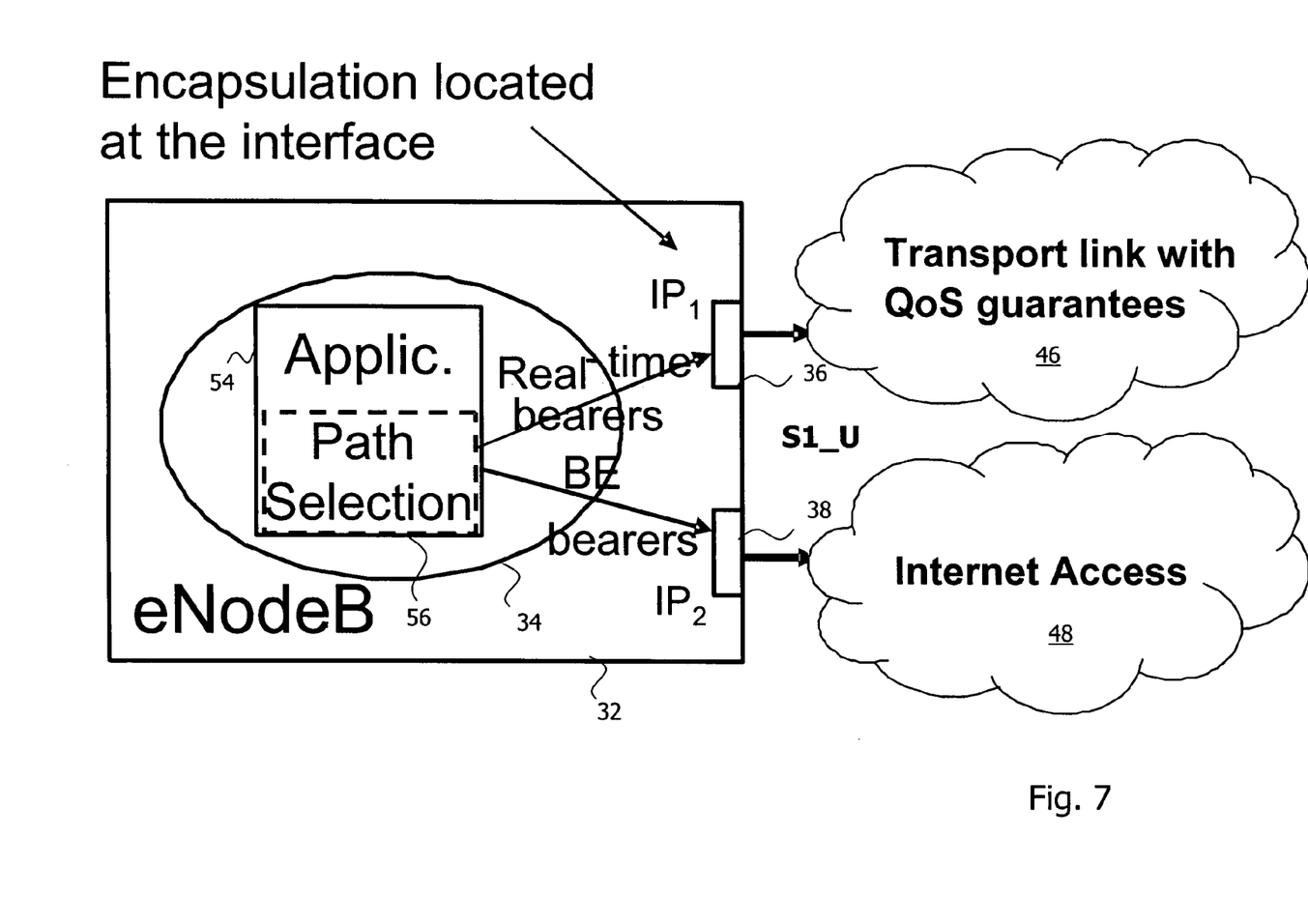
FIG. 7 schematically illustrates a still further embodiment of an RBS node.

FIG. 7 illustrates a corresponding embodiment of an eNodeB 32 that constitutes a specific implementation of the eNodeB 32 of FIG. 2. The GW node 16 of FIG. 1 may be implemented in a similar manner.

As shown in FIG. 7 the network traffic distribution function 34 of the eNodeB 32 is now located on the application layer. To this end, an application layer control function 54 is provided with a path selection function 56 that has knowledge of the relationship between the IP-based S1_U interfaces 36, 38 of the eNodeB 32 and the transport links 46, 48, and that selects the suitable interface 36, 38 depending on the QoS transport bearer settings. Since the selection process underlying the network traffic distribution is performed on the application layer (i.e., before the IP-based encapsulation process individually taking place for each interface 36, 38), the encapsulation process can be moved close to the physical interfaces 36, 38. For example, the encapsulation processes can be performed on an interface card of the eNodeB 32 hosting the two interfaces 36, 38.

In general, there will be different IP addressing on each transport link 46, 48 as indicated by the two IP addresses $IP_1$ and $IP_2$ associated with the two interfaces 36, 38, respectively. This fact implies that the destination IP addresses should be properly selected in the eNodeB 32 and in the GW node (not shown in FIG. 7). For example, in the uplink direction the application layer control function 54 in the eNodeB 32 should use a different tunnel endpoint address of the GW node for QoS sensitive network traffic on real-time bearers on the one hand and BE traffic on BE bearers on the other hand. In the downlink direction, the GW node implements a similar addressing technique to insure that the two different IP addresses $IP_1$ and $IP_2$ of the eNodeB 32 are selectively utilised in context with network traffic distribution. This addressing strategy assumes that different tunnel endpoint addresses can be signalled on the user plane for the different transport links 46, 48. While such a feature has not yet been standardised for SAE in 3GPP, it is currently supported by the GPRS Tunnelling Protocol (GTP) for tunnel establishment in 3G systems as specified in section 7.3.1 of the 3GPP technical specification TS 29.060.

To cope with transport link failures, the eNodeB 32 of FIG. 7 is configured such that data packets addressed to be routed on the failed transport link are routed on the other transport link. This provides transport link redundancy and requires the provision of routable addresses on each transport link 46, 48. In other words, both $IP_1$ and $IP_2$ should be routable on both the transport link 46 with QoS guarantees and the Internet access-based transport link 48. If such a configuration is not possible (for example because it is not possible to advertise $IP_1$ on the transport link 48), then the path selection function 56 on the application layer should be capable of detecting transport link failures and of redirecting network traffic arriving on transport bearers assigned to the failed transport link to the available transport link. Moreover, a hand-over function for the transport bearers may be implemented, along with a change of tunnel IP addresses belonging to the respective transport links.

Generally, the design option illustrated in FIG. 7 will be appropriate for eNodeBs 32 and GW nodes for which the network layer-based solution illustrated in FIGS. 4, 5, 6A and 6B cannot be implemented (for example because the nodes have an ATM-based inner architecture, so that the assembling of the IP data packets takes place only at the outgoing interface 36, 38 where network traffic distribution is no longer possible).

The embodiment illustrated in FIG. 7 could be configured such that the same IP address is used for both transport links 46, 48. This situation is illustrated in FIG. 8. The interfaces 36, 38 of the eNodeB 32 are each associated with the IP address $IP_1$, and the corresponding interfaces 40, 42 of the GW node 16 are each associated with the IP address $IP_2$. The embodiment of FIG. 8 requires that the same IP address is routable on each transport link 46, 48. It should thus be guaranteed by the respective routing mechanisms that data packets are routed separately on the two transport links 46, 48.

Figure 8:
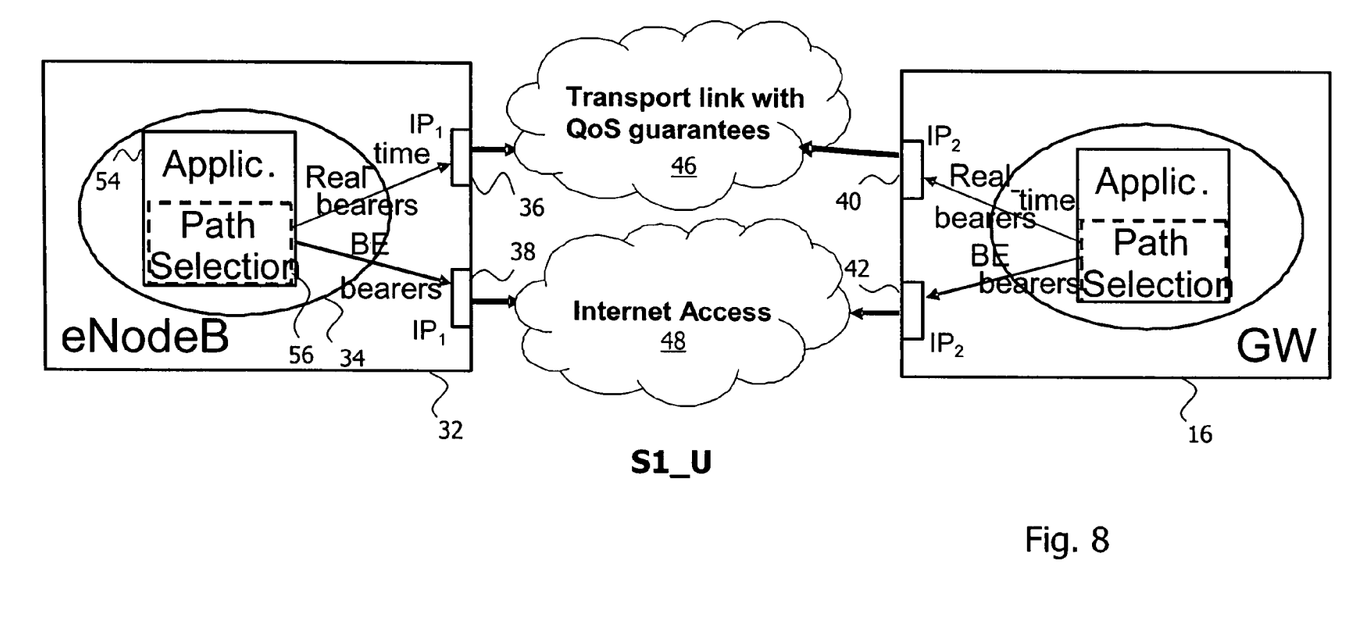
FIG. 8 schematically illustrates another system embodiment comprising an RBS node and a GW node.

The embodiment illustrated in FIG. 8 has the advantage that it is not required to signal different tunnel endpoint addresses to be used on the user plane for the different transport links 46, 48 during the bearer-setup process. One further consequence of using identical IP addresses for the different interfaces 36, 38 of the eNodeB 32 and the different interfaces 40, 42 of the GW node 16 is the fact that transport link failures cannot be handled by IP routing as discussed above in context with the embodiment of FIG. 7. Therefore, failure detection and failure handling should be implemented on the application layer within the path selection function 56. One advantage of such a modification is the fact that no hand-over for the transport bearers in the case of transport link failures needs to be signalled to the remote component, and as a result the application layer functionalities can be reduced compared to the more general case illustrated in FIG. 7.

Figure 9:
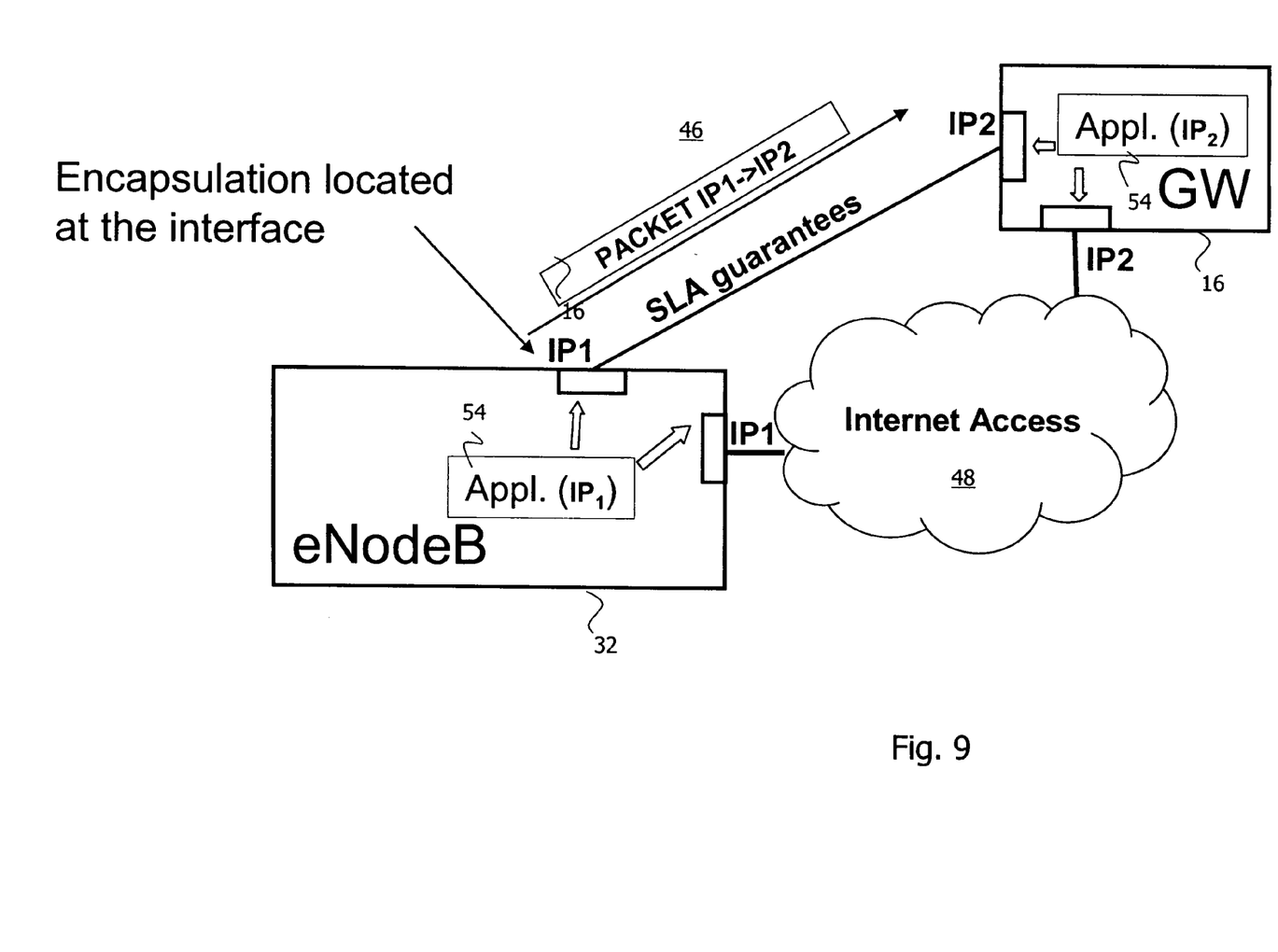
FIG. 9 schematically illustrates a further system embodiment with an RBS node and a GW node.

It is worth discussing the IP addressing scenario illustrated in FIG. 8 also in context with a direct connection between the eNodeB 32 and the GW node 16 as shown in FIG. 9. In the embodiment of FIG. 9 it is again assumed that the direct connection constitutes the transport link 46 with QoS guarantees.

The embodiment of FIG. 9 has the advantage that the application layer control function 54 can easily detect any failures of the direct transport link 46 and redirect the transport bearers appropriately. Moreover, many of the routing and addressing issues that require special handling in the embodiment discussed above in context with FIG. 8 do not occur in the embodiment of FIG. 9.

In the following, a still further design option will be discussed with reference to FIG. 10. Instead of performing network traffic distribution on the user plane (i.e., on the network layer as discussed in context with FIGS. 4, 5, 6B and 6B or on the application layer as discussed above in context with FIGS.

7, 8 and 9), network traffic distribution is now controlled by a control plane function. Additionally, network traffic distribution is no longer controlled dependent an the QoS settings of the transport bearers, but based on subscription settings.

Figure 10:
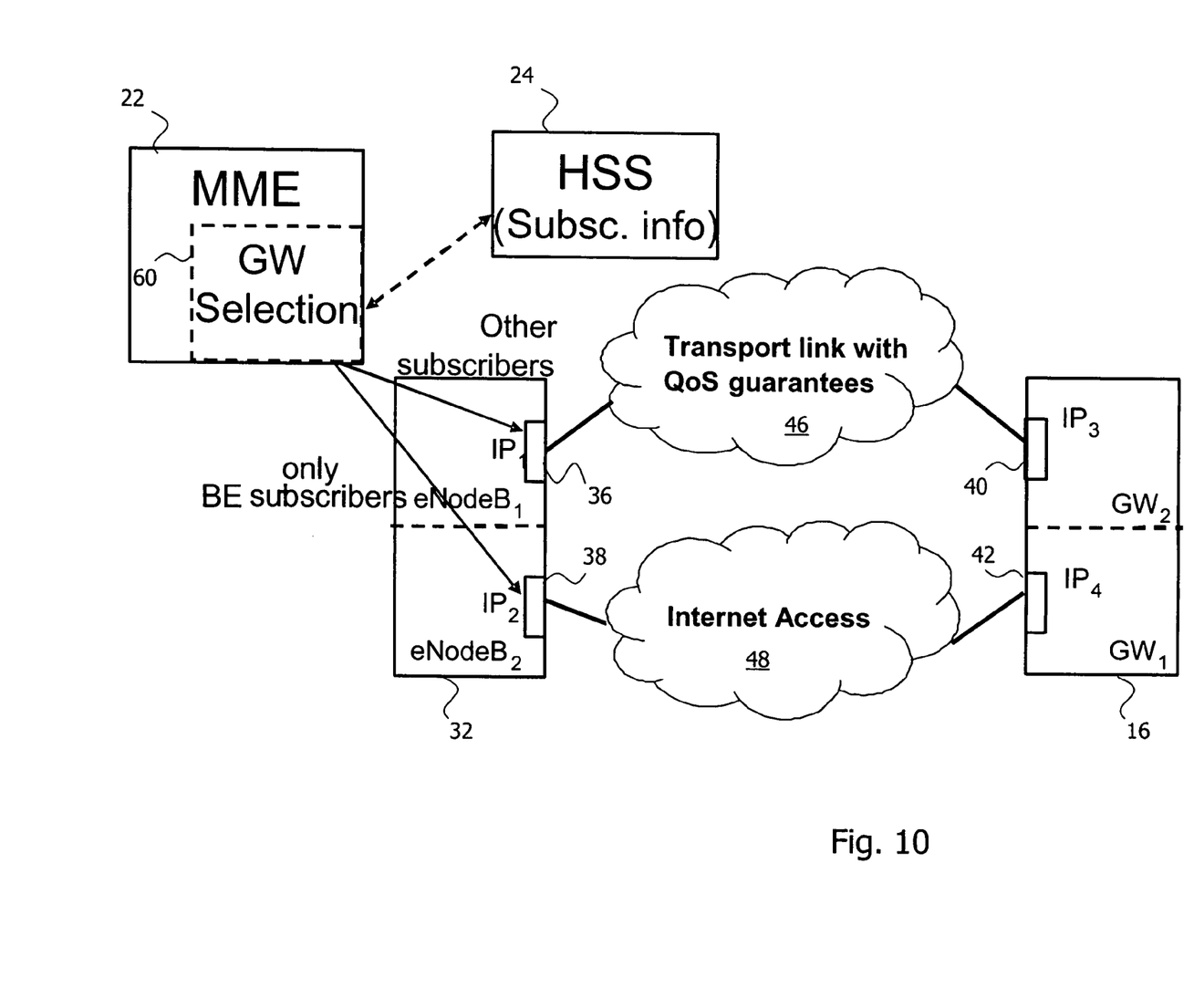
FIG. 10 schematically illustrates a still further system embodiment in which an RBS node and a GW node are each divided into two logical entities.

As shown in FIG. 10, network traffic distribution is handled by a GW selection function 60 implemented on the control plane within the MME 22. The GW selection function 60 performs network traffic distribution based on subscription information received from the HSS 24. Specifically, the GW selection function 60 is configured to select for a specific user call the appropriate interface 36, 38 (or IP address $IP_1$, $IP_2$) of the eNodeB 32 on the one hand and the appropriate interface 40, 42 (or IP address $IP_3$, $IP_4$) of the GW node 16 on the other hand.

To facilitate the operation of the control plane-based GW selection function 60, the user plane components addressed by the GW selection function 60 are split into individual, separately addressable entities. In the embodiment with two parallel transport links 46, 48 illustrated in FIG. 10, the eNodeB 32 is thus split into two eNodeB entities ($eNodeB_1$ and $eNodeB_2$), with each eNodeB entity being associated with a single interface 36, 38 (and thus with a single transport link 46, 48). In a similar manner, the GW node 16 is split into two GW node entities ($GW_1$ and $GW_2$), and each GW node entity is associated with a single interface 40, 42. It will be appreciated that in the case of three or more transport links, three or more eNodeB entities as well as three or more GW node entities will be provided.

The embodiment illustrated in FIG. 10 operates as follows. Upon receiving a request from a UE for call establishment, the GW selection function 60 of the MME 22 queries the HSS for the associated subscription information. The queried subscription information is indicative of whether or not the user has subscribed to QoS services. Depending on the subscription information, the GW selection function 60 arranges that the user call is connected to the logical eNodeB entity facing the transport link 46, 48 matching the user subscription. Later on, when a hand-over occurs, either the source eNodeB entity or the target eNodeB entity ensures that the hand-over happens to a target eNodeB entity that provides a similar type of transport link than the source eNodeB entity.

Due to the splitting of the eNodeB 32 and the GW node 16 in two logically separate entities, a special hand-over feature has to be provided to cope with the following situation. During the attachment process, it may happen that the UE of a BE-only subscriber contacts the eNodeB entity ($eNodeB_1$ in FIG. 10) connecting to the transport link 46 with QoS guarantees. In this case, the contacted eNodeB entity needs to hand-over the BE-only subscriber to the other eNodeB entity ($eNodeB_2$ in FIG. 10). Corresponding hand-over functions may be implemented in each eNodeB entity, and the actual hand-over may be triggered by the GW selection function 60 or any other function located in the MME 22.

The embodiment illustrated in FIG. 10 has also to be supported by the GW node 16. As mentioned above, the subscription information for selecting the eNodeB interfaces and GW node interfaces (i.e. the corresponding IP addresses) is received by the GW selection function 60 of the MME 22 from the HSS 24. As regards GW node address selection, the GW selection function 60 could only select which "contact address" of the GW node 60 to use, but it would be the GW node 16 itself which would assign the IP address to be used for a given bearer in the user plane. For example, the GW node 16 could be configured to operate as follows. If the GW node 16 is contacted at address $IP_3$ of GW node entity $GW_2$, it uses a first range X of user plane addresses, whereas if it is contacted at address IN of GW node entity $GW_1$, it uses a second range Y of user plane addresses.

This addressing mechanism helps to hide all details of IP addressing from the MME. In prior art solutions, the MME only provides a contact address of the GW node to the eNodeB, and it will than be the task of the GW node to select and send an IP address from which it will communicate on the user plane with the eNodeB. This basic concept may also be realised by the system architecture depicted in FIG. 10 with the difference that there will be two contact addresses, one for the Internet traffic and another one for traffic on the QoS bearers.

As has become from the above embodiments, a provision of parallel transport links between an RBS node such as an eNodeB and a GW node acting as common anchor point provides a plurality of advantages. These advantages include, for example, transport link redundancy. Another advantage is the fact that the embodiments offer a resource-efficient transmission solution for BE traffic not requiring any QoS guarantees. This may result in significant resource gains compared to solutions in which only transport links with QoS guarantees in the RAN are used, which makes LTE-SAE systems competitive with Wimax solutions even for broadband services.

A still further advantage is the fact that the architecture proposed herein may be incrementally deployed in RBS node/GW node pairs in which the ratio of BE traffic starts to be significant. Such a gradual introduction allows for a migration of existing infrastructure based on leased transport lines to a cost-efficient infrastructure including rented Internet connections.

Obviously, the solutions presented herein are applicable to any RAN technology facing a mix of QoS traffic and BE traffic. Specifically, the solutions may also be applied on the RAN access side of existing 2G and 3G systems. In particular, the solution may be applied to any existing or future RBS nodes deployed near to fixed DSL services providing Internet access.

While the current invention has been described in relation to its preferred embodiments, it is to be understood that this description is for illustrative purposes only. Accordingly, it is intended that the invention be limited only by the scope of the claims appended hereto.

The invention claimed is:

1. A method of transferring network traffic between a radio base station (RBS) node and a gateway (GW) node of a mobile telecommunications network, the method comprising:
    providing a first transport link and a second transport link between the RBS node and the GW node, the first transport link being configured to transport network traffic of a higher priority and the second transport link being configured to transport network traffic of a lower priority; and
    distributing network traffic over the transport links depending on an assignment between the transport links and priority settings associated with the network traffic, wherein the assignment is a mapping relationship uniquely assigning each of the first and second transport link to network traffic originating from a particular subscriber or class of subscribers, or network traffic being against the services and will want you all are thank you, Transported on a specific transport bearer or class of transport bearers, wherein the first and second interfaces are configured as S1_U interfaces defined according to a Long-Term Evolution (LTE) standard.

2. The method of claim 1, wherein the priority settings are further associated with network traffic transport bearers.

3. The method of claim 1, wherein the priority settings are derived from subscription information of a user generating the network traffic.

4. The method of claim 3, further comprising-attaching a user connection to the RBS and GW nodes interfacing the first or second transport link depending on the subscription information and an assignment between the transport links and priority settings associated with the network traffic.

5. The method of claim 4, wherein the mobile telecommunications network comprises a user plane including the first and second transport links and a control plane including a control plane function adapted to control the attaching of the user connection to the RBS and GW nodes.

6. The method of claim 1, wherein the mobile telecommunications network comprises a link layer, and wherein the network traffic distribution is performed by a link layer control function.

7. The method of claim 6, wherein the link layer control function is installed on at least one of the RBS node, the GW node, and a separate node in the mobile telecommunications network.

8. The method of claim 6, wherein the link layer control function performs network traffic distribution in accordance with priority markings included in network traffic data units.

9. The method of claim 8, wherein the mobile telecommunications network comprises an application layer, and wherein the priority markings are inserted in the network traffic data units by an application function depending on the priority settings.

10. The method of claim 9, wherein the application function is installed on at least one of the RBS node, the GW node, and a separate node.

11. The method of claim 9, wherein the first transport link is a dedicated data communication connection with Quality of Service guarantee and the second transport link stretches at least partially across the Internet.

12. The method of claim 1, wherein the mobile telecommunications network comprises a network layer, and wherein the network traffic distribution is performed by a network layer control function.

13. The method of claim 12, wherein the network layer control function is installed on at least one of the RBS node, the GW node, and a separate node in the mobile telecommunications network.

14. The method of claim 1, wherein the mobile telecommunications network comprises an application layer, and wherein network traffic distribution is performed by an application layer control function.

15. The method of claim 1, wherein the first transport link stretches between a first interface associated with the RBS node and a first interface associated with the GW node, and wherein the second transport link stretches between a second interface associated with the RBS node and a second interface associated with the GW node.

16. The method of claim 1, wherein the first transport link and the second transport link utilise disjunct communication connections.

17. The method of claim 1, wherein the network traffic of higher priority is associated with a first Quality of Service (QoS) class, and wherein the network traffic of lower priority Is associated with a best effort class or a second QoS class that is lower than the first QoS class.

18. The method of claim 1, further comprising splitting each of the RBS node and the GW node to at least two logical entities, wherein each said first and second transport link extends between a logical RBS entity and a logical GW entity.

19. The method of claim 1, further comprising:
    determining a failure in relation to one of the transport links; and
    transporting network traffic that is intended to be transported over the transport link effected by the failure over another one of said transport links.

20. A method of transferring network traffic between a radio base station (RBS) node and a gateway (GW) node of a mobile telecommunications network, the method comprising:
    providing a first transport link and a second transport link between the RBS node and the GW node, the first transport link being configured to transport network traffic of a higher priority and the second transport link being configured to transport network traffic of a lower priority; and
    distributing network traffic over the transport links depending on an assignment between the transport links and priority settings associated with the network traffic, wherein the assignment is a mapping relationship uniquely assigning each of the first and second transport link to network traffic originating from a particular subscriber or class of subscribers, or network traffic being transported on a specific transport bearer or class of transport bearers,
    wherein the priority settings are derived from subscription information of a user generating the network traffic, and
    wherein a control function performs network traffic distribution by sending network traffic to an interface that connects to the first or second transport link depending on the assignment between the transport links and priority settings associated with the network traffic.

21. A method of transferring network traffic between a radio base station (RBS) node and a gateway (GW) node of a mobile telecommunications network, the method comprising:
    providing a first transport link and a second transport link between the RBS node and the GW node, the first transport link being configured to transport network traffic of a higher priority and the second transport link being configured to transport network traffic of a lower priority; and
    distributing network traffic over the transport links depending on an assignment between the transport links and priority settings associated with the network traffic, wherein the assignment is a mapping relationship uniquely assigning each of the first and second transport link to network traffic originating from a particular subscriber or class of subscribers, or network traffic being transported on a specific transport bearer or class of transport bearers,
    wherein the mobile telecommunications network comprises an application layer, and wherein network traffic distribution is performed by an application layer control function, and
    wherein the application layer control function performs network traffic distribution by sending network traffic towards a dedicated data unit generation function interfacing the first or second transport link depending on the assignment between the transport links and priority settings associated with the network traffic.

22. A method of transferring network traffic between a radio base station (RBS) node and a gateway (GW) node of a mobile telecommunications network, the method comprising:

providing a first transport link and a second transport link between the RBS node and the GW node, the first transport link being configured to transport network traffic of a higher priority and the second transport link being configured to transport network traffic of a lower priority; and distributing network traffic over the transport links depending on an assignment between the transport links and priority settings associated with the network traffic, wherein the assignment is a mapping relationship uniquely assigning each of the first and second transport link to network traffic originating from a particular subscriber or class of subscribers, or network traffic being transported on a specific transport bearer or class of transport bearers, wherein the first transport link stretches between a first interface associated with the RBS node and a first interface associated with the GW node, and wherein the second transport link stretches between a second interface associated with the RBS node and a second interface associated with the GW node, and wherein the first and second interfaces associated with a particular node share a common data unit generation function.

23. A method of transferring network traffic between a radio base station (RBS) node and a gateway (GW) node of a mobile telecommunications network, the method comprising:

providing a first transport link and a second transport link between the RBS node and the GW node, the first transport link being configured to transport network traffic of a higher priority and the second transport link being configured to transport network traffic of a lower priority; and distributing network traffic over the transport links depending on an assignment between the transport links and priority settings associated with the network traffic, wherein the assignment is a mapping relationship uniquely assigning each of the first and second transport link to network traffic originating from a particular subscriber or class of subscribers, or network traffic being transported on a specific transport bearer or class of transport bearers, wherein the first transport link stretches between a first interface associated with the RBS node and a first interface associated with the GW node, and wherein the second transport link stretches between a second interface associated with the RBS node and a second interface associated with the GW node, and wherein the first and second interfaces associated with a particular node each have a dedicated data unit generation function.

24. A non-transitory computer readable medium storing program code portions that, when executed by at least one processor, causes the processor to perform the steps of claim 1.

25. A device for transferring network traffic between a radio base station (RBS) node and a gateway (GW) node of a mobile telecommunications network, the device comprising:

dedicated interfaces coupled to at least a first transport link and a second transport link to one of the RBS node and the GW node, the first transport link being configured to transport network traffic of a higher priority and the second transport link being configured to transport network traffic of a lower priority; and a distributing function for distributing network traffic over the first and second transport links depending on an assignment between the first and second transport links and priority settings associated with the network traffic, wherein the assignment is a mapping relationship uniquely assigning each of the first and second transport link to network traffic originating from a particular subscriber or class of subscribers, or network traffic being transported on a specific transport bearer or class of transport bearers, wherein the first and second interfaces are configured as S1_U interfaces defined according to a Long-Term Evolution (LTE) standard.

26. A radio base station node comprising the device of claim 25.

27. A gateway node comprising the device of claim 25.

28. A router or switch comprising the device of claim 25.

* * * * *